(12) United States Patent
Singh (10) Patent No.: US 8,184,556 B2
(45) Date of Patent: May 22, 2012

(54) SYSTEMS AND METHODS FOR DISTANCE-PROOF N-PASS AUTO NEGOTIATION FOR GIGABIT ETHERNET

(75) Inventor: Vikram Singh, Noida (IN)

(73) Assignee: Ciena Corporation, Linthicum, MD (US)

( * ) Notice: Subject to any disclaimer, the term of this patent is extended or adjusted under 35 U.S.C. 154(b) by 552 days.

(21) Appl. No.: 11/942,225

(22) Filed: Nov. 19, 2007

(65) Prior Publication Data
US 2009/0129777 A1  May 21, 2009

(51) Int. Cl.
*H04L 12/28* (2006.01)
(52) U.S. Cl. .............. 370/255; 370/254; 370/395.53
(58) Field of Classification Search .......... 370/254, 370/255, 395.53
See application file for complete search history.

(56) References Cited

U.S. PATENT DOCUMENTS

| | | | | |
|---|---|---|---|---|
| 5,673,254 A | * | 9/1997 | Crayford | 370/231 |
| 6,012,096 A | * | 1/2000 | Link et al. | 709/233 |
| 6,977,893 B1 | * | 12/2005 | Lund | 370/232 |
| 2001/0056503 A1 | * | 12/2001 | Hibbard | 709/250 |
| 2002/0039354 A1 | * | 4/2002 | Chen et al. | 370/296 |
| 2004/0028408 A1 | * | 2/2004 | Cox et al. | 398/66 |
| 2005/0165959 A1 | * | 7/2005 | Huff | 709/238 |
| 2005/0175024 A1 | * | 8/2005 | Ho et al. | 370/412 |

OTHER PUBLICATIONS

IEEE; Information Technology—Telecommunications and information exchange between systems—Local and metropolitan area networks—Specific requirements—Part 3: Carrier Sense Multiple Access with Collision Detection (CSMA/CD) access method and physical layer specifications; Copyright (c) 2005 IEEE. All rights reserved.
Clause 37 Auto-Negotiation: An introduction to the Auto-Negotiation process; (c) University of New Hampshire Interoperability Laboratory.

* cited by examiner

*Primary Examiner* — Dang Ton
*Assistant Examiner* — Robert M Morlan
(74) *Attorney, Agent, or Firm* — Clements Bernard PLLC; Christopher L. Bernard; Lawrence A. Baratta, Jr.

(57) ABSTRACT

The present invention provides distance-proof N-pass Auto Negotiation systems and methods for Gigabit Ethernet. The present invention distance proofs Auto Negotiation. No matter the distance between two nodes configured according to the systems and methods of the present invention, the link at either end of the two nodes will only come up once each end has negotiated, resolved its link partner's capabilities, and received a similar success signal from the remote node.

19 Claims, 7 Drawing Sheets

SYSTEMS AND METHODS FOR DISTANCE-PROOF N-PASS AUTO NEGOTIATION FOR GIGABIT ETHERNET

FIELD OF THE INVENTION

The present invention relates generally to Ethernet, and more particularly, to systems and methods for distance-proof N-pass Auto Negotiation mechanisms which enable Auto Negotiation between Ethernet devices despite delay due to extended distances over an optical network.

BACKGROUND OF THE INVENTION

The IEEE 802.3-2005 standard, which is incorporated in-full by reference herein, specifies Ethernet local area network (LAN) operation for selected speeds of operation from 1 Mb/s to 10 Gb/s using a common media access control (MAC) specification, management information base (MIB), and capability for Link Aggregation of multiple physical links into a single logical link. Gigabit Ethernet (GbE) is one particular implementation defined in the IEEE 802.3-2005. GbE is commonly referred to as 1000BASE-X, where -X refers to either -CX, -SX, -LX, or (non-standard)-ZX In IEEE 802.3-2005 clause 37, Auto Negotiation for 1000BASE-X allows a device (local device) to advertise modes of operation it possesses to a device at the remote end of a link segment (link partner) and to detect corresponding operational modes that the link partner may be advertising. The Auto Negotiation function exchanges information between two devices that share a link segment and automatically configures both devices to take maximum advantage of their abilities. The Auto Negotiation function allows the devices at both ends of a link segment to advertise abilities, acknowledge receipt and understanding of the common mode(s) of operation that both devices share, and to reject the use of operational modes that are not shared by both devices.

Optical transmission systems can be used to provide extended reach between Ethernet clients, such as GbE. For example, these systems can include SONET/SDH network elements, Optical Transport Network (OTN) network elements, dense wave division multiplexing (DWDM), coarse wave division multiplexing (CWDM), and the like with optical amplifiers and repeaters to provide extended reach. Additionally, these systems can also support IEEE 802.3-2005 specifications providing layer two support functionality for Ethernet clients. For example, conventional SONET/SDH/OTN and DWDM/CWDM transponder systems currently support layer two interfaces, such as GbE, and can include Auto Negotiation functionality.

Figure 1:
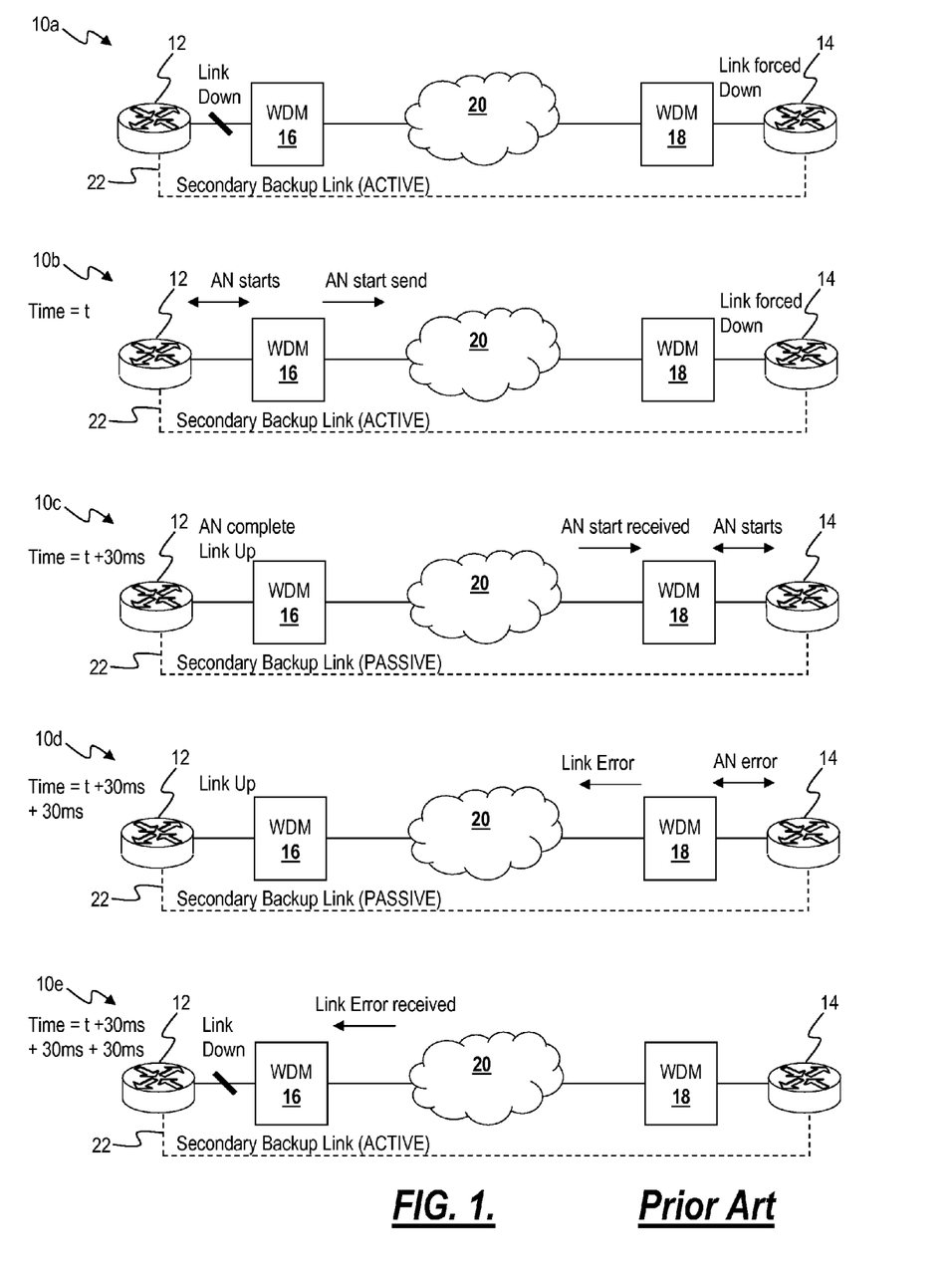
FIG. 1 is a network diagram illustrating Auto Negotiation steps between clients connected through wavelength division multiplexed (WDM) devices over an optical network.

Referring to FIG. 1, a network diagram illustrates an example of Auto Negotiation in steps 10a-e between clients 12,14 connected through wavelength division multiplexed (WDM) 16,18 devices over an optical network 20. The clients 12,14 can include switches, routers, or the like with GbE interfaces to the WDM devices 16,18. The WDM devices 16,18 include line cards capable of receiving GbE interfaces and providing Ethernet capabilities, such as Auto Negotiation. Additionally, the WDM devices 16,18 can include optical amplifiers, optical filters, and the like as are known in the art with regards to optical transmission systems. The optical network 20 represents intervening nodes (not shown) at geographically diverse locations. For example, the optical network 20 can span 8000 km in an exemplary embodiment.

FIG. 1 illustrates Auto Negotiation steps 10a-e according to conventional mechanisms with the optical network 20 spanning 8000 km between the WDM devices 16,18. In this exemplary embodiment, each of the clients 12,14 and the WDM devices 16,18 supports Auto Negotiation. In step 10a, there is a fiber break or other link failure between the client 12 and the WDM device 16. Accordingly, GbE ports on the WDM devices 16,18 are down, and the link between the WDM device 18 and the client 14 is forced down. A secondary backup link 22 can become active between the clients 12,14. The secondary backup link 22 can utilize a different route (i.e., in the event of a fiber break), different equipment (i.e., in the event of an equipment failure), or the like.

At step 10b which is at a time t, the link between the client 12 and the WDM device 16 is back up and running. Here, Auto Negotiation begins between the client 12 and the WDM device 16, and the WDM device 16 sends an Auto Negotiation start message to the WDM device 18 through the optical network 20. At step 10c which is at time t+30 ms, the Auto Negotiation is complete between the client 12 and the WDM device 16 and the link is up with the secondary backup link 22 back in a passive state. Also, the Auto Negotiation start message is received by the WDM device 18 through the optical network 20, and the WDM device 18 begins Auto Negotiation with the client 14. Note, in this example, the Auto Negotiation state machines between the WDM devices 16,18 are spaced apart by a delta time. This delta time represents the transit time through the optical network 20. For example, on the optical network 20 with a link length of 8000 km, the delta time would be approximately 30 ms. This delta time is a function of the latency associated with the optical network 20.

Each of the clients 12,14 and the WDM devices 16,18 are configured to operate Auto Negotiation state machines. For example, IEEE 802.3-2005 defines the Auto Negotiation state machine in FIG. 37-6. The state machine operated at the client 12 is ahead of the state machine at the WDM device 16 because of the distance and associated latency on the optical network 20. Accordingly, the state machine at the client 12 determines success between the client 12 and the WDM device 16 and the link is up at step 10c. This causes the client 12 to stop transmitting on the secondary backup link 22 as it reverts to the primary link between the client 12 and the WDM device 16. Finally at step 10c, the WDM device 18 receives the Auto Negotiation start message, and Auto Negotiation starts between the WDM device 18 and the client 14.

At step 10d which is at a time t+30 ms+30 ms, it is determined that there is an Auto Negotiation error between the client 14 and the WDM device 18. For example, the link between client 14 and WDM device 18 could be set for half duplex while the other links are full duplex. Accordingly, the link between the client 14 and the WDM device 18 is not up, and the secondary backup link 22 is also not up. Here, WDM device 18 sends a link error message to WDM device 16 based on the Auto Negotiation error. At step 10e which is at a time t+30 ms+30 ms+30 ms, the WDM device 16 receives the link error message and sends this to the client 12 which accordingly begins transmitting on the secondary backup link 22 again. Effectively, this process results in a link flagging at client 12 between the primary and secondary link 22 which results in a traffic hit of at least 60 ms.

The Auto Negotiation specification includes a LINK_TIMER which is defined as 10 ms with a tolerance of +10 ms. This is the only timer defined in clause 37 of IEEE 802.3, and it is used throughout the Auto Negotiation process to verify that both link partners have enough time to complete. The tolerance is implementation specific and may not be the same across different system implementations. Generally, a single pass through Auto Negotiation, i.e. a run of the Auto Negotiation state machine, takes approximately 30 ms due to the number of instances LINK_TIMER is operated in the state machine.

Thus, the conventional Auto Negotiation mechanisms can fail when any two client devices are space apart by a delta time such that the route transit time results in one state machine finishing before the other signals a success or failure indication. Any failure to successfully negotiate will only be reported at another client after a minimum of 2× delta time. Disadvantageously, these current mechanisms prevent Auto Negotiation over extended distances as are common with regard to Ethernet clients over optical networks.

BRIEF SUMMARY OF THE INVENTION

In various exemplary embodiments, the present invention provides distance-proof N-pass Auto Negotiation systems and methods for Gigabit Ethernet and the like. The present invention distance proofs Auto Negotiation. No matter the distance between two nodes configured according to the systems and methods of the present invention, the link at either end of the two nodes will only come up once each end has negotiated, resolved its link partner's capabilities, and received a similar success signal from the remote node. Advantageously, the present invention provides an exemplary embodiment which maintains compliance to the IEEE 802.3-2005 standards.

In an exemplary embodiment of the present invention, a method for distance proof Auto Negotiation includes determining a delay between a first and second node, wherein the first and second nodes include an Ethernet link configured to Auto Negotiate, and implementing delay mechanisms at the first and second nodes in Auto Negotiation responsive to the determined delay. In one exemplary embodiment, the delay mechanisms include setting a variable n which is the number of Auto Negotiation restarts responsive to the determined delay, restarting Auto Negotiation up to n times responsive to successful priority resolution, and if Auto Negotiation is restarted n times without receiving an indication, declaring link down at the end of the nth time Auto Negotiation is run. The variable n is one of manually set through a management system connected to the first and second nodes and automatically set by the first and second nodes. Optionally, the determined delay is measured through a latency measurement algorithm between the first and second nodes, and the latency measurement algorithm includes an exchange of timestamped messaged between the first and second nodes to determine delay. The variable n can be determined based on a constant value of two representing one restart for each state machine at the first and second node plus an average round trip delay between the first and second nodes divided by a time for running Auto Negotiation. In another exemplary embodiment, the delay mechanisms include waiting at IDLE_DETECT during Auto Negotiation at the first node until reception of an indication from the second node. The waiting at IDLE_DETECT can be up to a predetermined time period. Optionally, the first and second nodes include optical network elements, and the delay is responsive to latency associated with an extended distance between the first and second nodes.

In another exemplary embodiment of the present invention, a method for distance proof n-pass Auto Negotiation includes determining a delay between a first and second node, wherein the first and second nodes include an Ethernet link configured to Auto Negotiate, setting a variable n which is the number of Auto Negotiation restarts responsive to the determined delay, receiving an Auto Negotiation start at the first node, starting an Auto Negotiation state machine at the first node, during an IDLE_DETECT state, restarting Auto Negotiation at both the first and second node up to n times responsive to successful priority resolution, and if Auto Negotiation is restarted n times without receiving an indication from the second node, declaring link down at the end of the nth time Auto Negotiation is run. The variable n can be one of manually set through a management system connected to the first and second nodes and automatically set by the first and second nodes.

Optionally, the determined delay is measured through a latency measurement algorithm between the first and second nodes, and the latency measurement algorithm includes an exchange of timestamped messaged between the first and second nodes to determine delay. Alternatively, the variable n is determined based on a constant value of two representing one restart for each state machine at the first and second node plus an average round trip delay between the first and second nodes divided by a time for running Auto Negotiation. Optionally, the first and second nodes include optical network elements, and the delay is responsive to latency associated with an extended distance between the first and second nodes. Alternatively, the method for distance proof n-pass Auto Negotiation is compliant to IEEE 802.3 standards for 1000BASE-X Auto Negotiation.

In yet another exemplary embodiment of the present invention, a network configured for distance proof Auto Negotiation includes a first optical network element connected to a first Ethernet client device, and a second optical network element connected to a second Ethernet client device, wherein the second optical network element is interconnected to the first optical network element through an optical network, and wherein the optical network causes delay between the first optical network element and the second optical network element, wherein each of the first optical network element, the second optical network element, the first Ethernet client device, and the second Ethernet client device is configured to perform Auto Negotiation, and wherein the first optical network element and the second optical network element are configured to provide distance proof Auto Negotiation including implementing delay mechanisms in Auto Negotiation responsive to the delay between the first optical network element and the second optical network element.

Optionally, the delay mechanisms include determining the delay between the first optical network element and the second optical network element, setting a variable n which is the number of Auto Negotiation restarts responsive to the determined delay, restarting Auto Negotiation up to n times responsive to successful priority resolution, and if Auto Negotiation is restarted n times without receiving an indication, declaring link down at the end of the nth time Auto Negotiation is run at the first optical network element. The variable n can be one of manually set through a management system connected to the first and second optical network elements and automatically set by the first and second optical network elements.

Alternatively, the determined delay is measured through a latency measurement algorithm between the first and second optical network elements, and the latency measurement algorithm includes an exchange of timestamped messaged between the first and second optical network elements to determine delay. The variable n can be determined based on a constant value of two representing one restart for each state machine at the first and second node plus an average round trip delay between the first and second nodes divided by a time for running Auto Negotiation. Optionally, the first and second Ethernet client devices include storage area network devices.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides distance-proof N-pass Auto Negotiation systems and methods for Gigabit Ethernet and the like. The present invention distance proofs Auto Negotiation. No matter the distance between two nodes configured according to the systems and methods of the present invention, the link at either end of the two nodes will only come up once each end has negotiated, resolved its link partner's capabilities, and received a similar success signal from the remote node.

Figure 2:
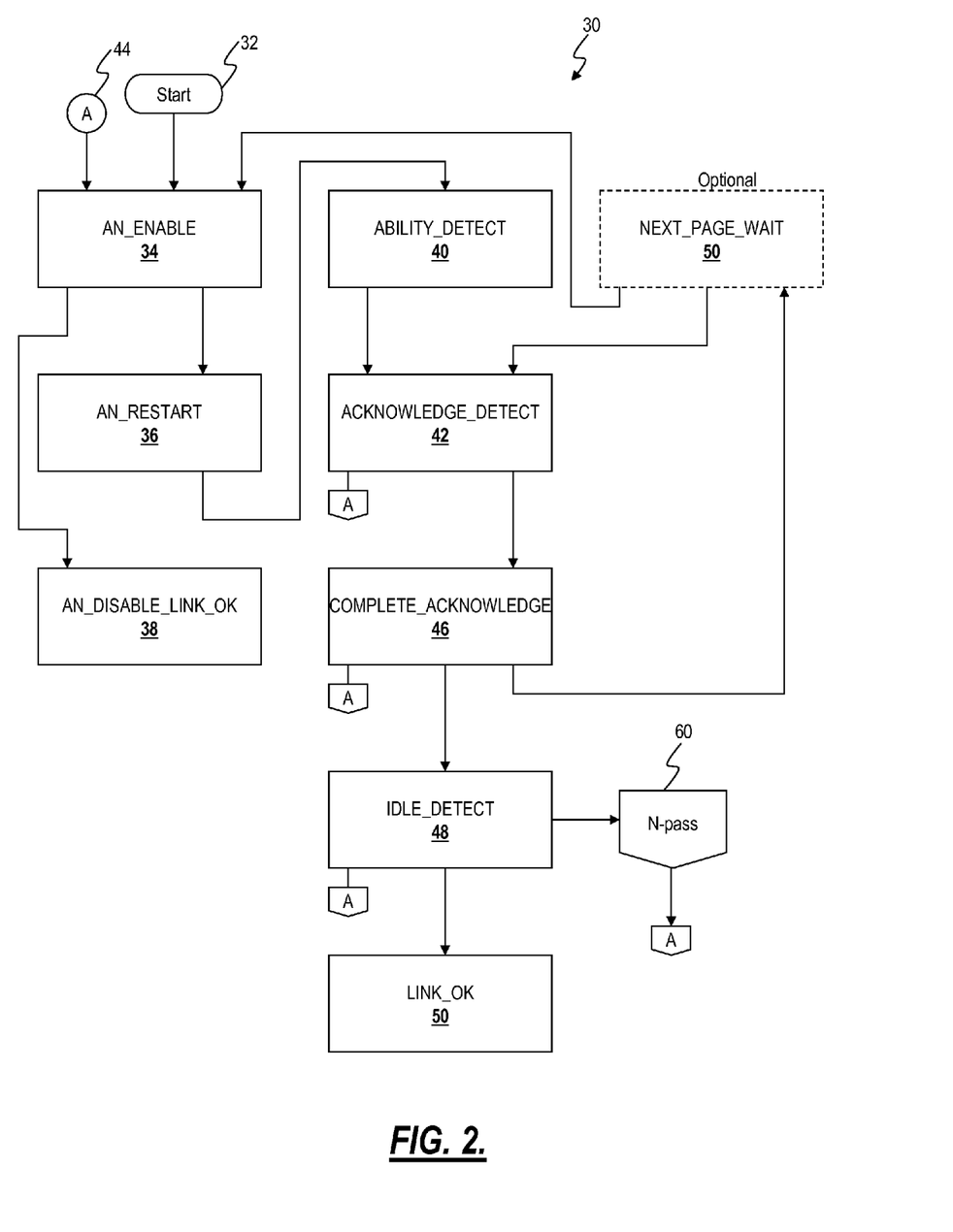
FIG. 2 is a state diagram of distance-proof Auto Negotiation according to an exemplary embodiment of the present invention.

Referring to FIG. 2, an Auto Negotiation state diagram 30 which is distance-proof is illustrated according to an exemplary embodiment of the present invention. The Auto Negotiation state diagram 30 is started at power on, at link reset, at link fail, at link enable, and the like (step 32). The first state is AN_ENABLE 34 which is the starting point for Auto Negotiation. Here, the device entering Auto Negotiation transmits a breaklink. The state diagram 30 exits to AN_RESTART 36 if Auto Negotiation is enabled, and to AN_DISABLE_LINK_OK 38 if Auto Negotiation is disabled. The AN_RESTART 36 state ensures that the link partner sees that the device is restarting Auto Negotiation. The state diagram 30 exits from AN_RESTART 36 after a LINK_TIMER duration (10 ms+up to 10 ms tolerance).

After AN_RESTART 36, the state diagram 30 enters ABILITY_DETECT 40. This state ensures the device is receiving proper abilities from the link partner, and the device transmits its own abilities to the link partner. The ABILITY_DETECT 40 state exits after the device has received three consecutive config_regs that are not breaklink. Next, the state diagram enters ACKNOWLEDGE_DETECT 42 which ensures that the link partner has acknowledged that it has seen the device's abilities. Also, the device transmits an acknowledgment to the link partner. The ACKNOWLEDGE_DETECT 42 state exits back to start 44 if the device receives three consecutive config_regs with breaklink or if the received abilities in ACKNOWLEDGE_DETECT 42 are different than the abilities received in ABILITY_DETECT 40. The ACKNOWLEDGE_DETECT 42 exits to COMPLETE_ACKNOWLEDGE 46 if the abilities match between the A ACKNOWLEDGE_DETECT 42 and ABILITY_DETECT 40 states.

The COMPLETE_ACKNOWLEDGE 46 state ensures that the link partner has time to see that the device has sent an acknowledgment. The COMPLETE_ACKNOWLEDGE 46 state exits to the start 44 if the device receives three consecutive config_regs with breaklink. The COMPLETE_ACKNOWLEDGE 46 state exits to IDLE_DETECT 48 after the LINK_TIMER is done and if one of the devices does not support next page exchange or if both devices are done transmitting next pages and the device is not receiving breaklink. The COMPLETE_ACKNOWLEDGE 46 state exits to NEXT_PAGE_WAIT 50 is both devices support next page exchange and at least one device still has next pages to transmit.

The IDLE_DETECT 48 state ensures the link partner is ready to establish a link before the device relinquishes control to the Physical Coding Sublayer (PCS). The IDLE_DETECT 48 state returns to start 44 if the device receives three consecutive config_regs with breaklink. The IDLE_DETECT 48 states exits to LINK_OK 50 if the device receives three consecutive idle codes and the LINK_TIMER is done. In the LINK_OK 50 state, Auto Negotiation is complete and the PCS now has control.

The present invention provides mechanisms to allow the Auto Negotiation state diagram 30 to operate despite latency between devices, such as due to extended distances over optical networks, over satellite networks, or the like. In one exemplary embodiment of the present invention, n-pass 60 steps are taken in the IDLE_DETECT 48 state to provide a distance-proof implementation of the state diagram 30. In another exemplary embodiment of the present invention, the state diagram can remain in the IDLE_DETECT 48 state until success is determined from the other end. Here, the state diagram proceeds to the LINK_OK 50 state only after receiving acknowledgment from the other end. Note, this embodiment is not standards compliant.

Figure 3:
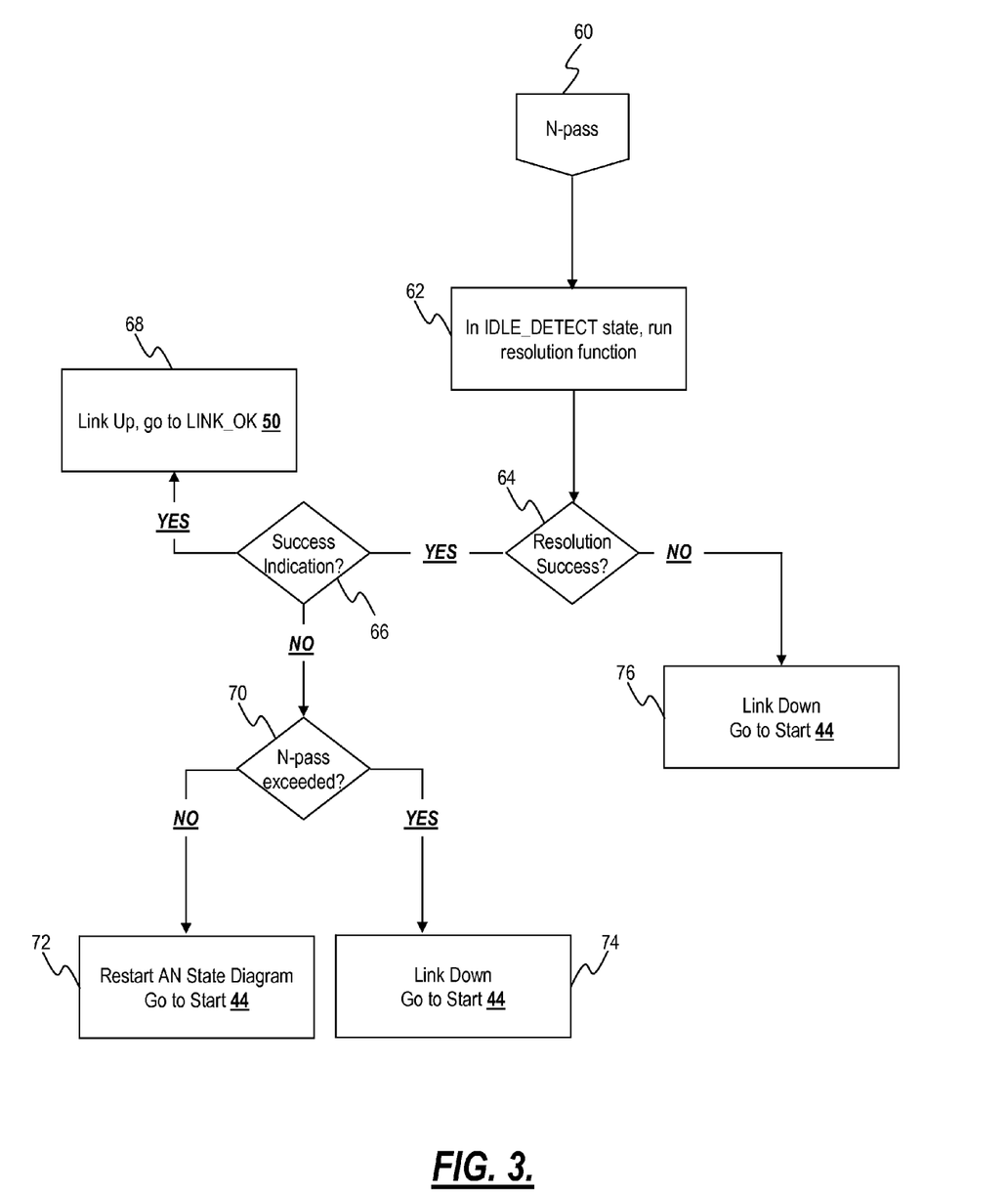
FIG. 3 is a flowchart illustrating n-pass steps for distance-proofing the Auto Negotiation state diagram of FIG. 2 according to an exemplary embodiment of the present invention.

Referring to FIG. 3, a flowchart illustrates the n-pass 60 steps for distance-proofing the Auto Negotiation state diagram 30 according to an exemplary embodiment of the present invention. The n-pass step 60 is entered once the state diagram 30 is in the IDLE_DETECT 48 state. In the IDLE_DETECT 48 state, the priority resolution function is run (step 62). The present invention utilizes an n-pass architecture where the state diagram 30 is restarted up to n times, i.e. "n-pass," where n is a function of the latency between clients.

The n-pass step 60 is configured to run n times while at the IDLE_DETECT 48 state while the node is successfully resolving the capabilities in order to provide the other end time to provide a success or failure indication of Auto Negotiation. If the device does not receive a success or failure indication within n-passes, then the link is declared down and breaklinks are sent. Conversely, if the other end sends a success or failure indication, the n-pass steps 60 are stopped, and the state diagram 30 proceeds to LINK_OK 50.

If the node successfully resolves the capabilities (step 64), then it is checked to see if a success indication has been received from the other end (step 66). If so, the link is up, and the state diagram 30 proceeds to the LINK_OK 50 state. If not, then an n-pass counter is checked (step 70) to see if the node has restarted the state diagram 30 n times yet. If not, then the node restarts the Auto Negotiation state diagram 30 by going back to the start 44 (step 72). If the node has already restarted n times (step 70), then the state diagram 30 declares the link down and proceeds to the start 44 (step 74). In the node does not successfully resolve the capabilities (step 64), then the state diagram 30 declares the link down and proceeds to the start 44 (step 76). Declaring the link down includes sending breaklinks to the other end and to an attached client. Additionally, the n-steps 60 can declare the link down upon receiving a failure indication from the other end as well.

The LINK_TIMER at most provides up to 20 ms of tolerance (10 ms+10 ms of tolerance). Now even if all the standard driven Auto Negotiation implementations have this tolerance build in, then the max link timer value can be 20 ms. The priority resolution function runs in the IDLE_DETECT 48 state. Assume that the priority resolution function runs as soon as the state diagram enters the IDLE_DETECT 48 state and starts the link timer, there is only 20 ms round trip time to send an Auto Negotiate restart message to the end node and to receive the response. Now even if the auto negotiation state machine 30 at the other end completes in 1 ms, there is only 19 ms for the transmission delay. Now, assuming the packet travels at the speed of light, then that maximum distance that this could cater to is 7600 km round trip. Hence the maximum distance that is possible between B and C is 3800 km. Note, these are all best-case assumptions, and likely would be significantly lower given extra latency on the optical network, such as due to equipment delays, and slower state machine 30 operation.

Advantageously, this implementation is completely standards-compliant and distance proof upon selecting n appropriately as described herein. These mechanisms can be implemented on layer two compliant optical network elements which interconnected over an IEEE 802.3-2005 compliant link over extended distances. Accordingly, clients attached to the optical network elements can successfully auto negotiate despite extended distances and associated latency.

Figure 4:
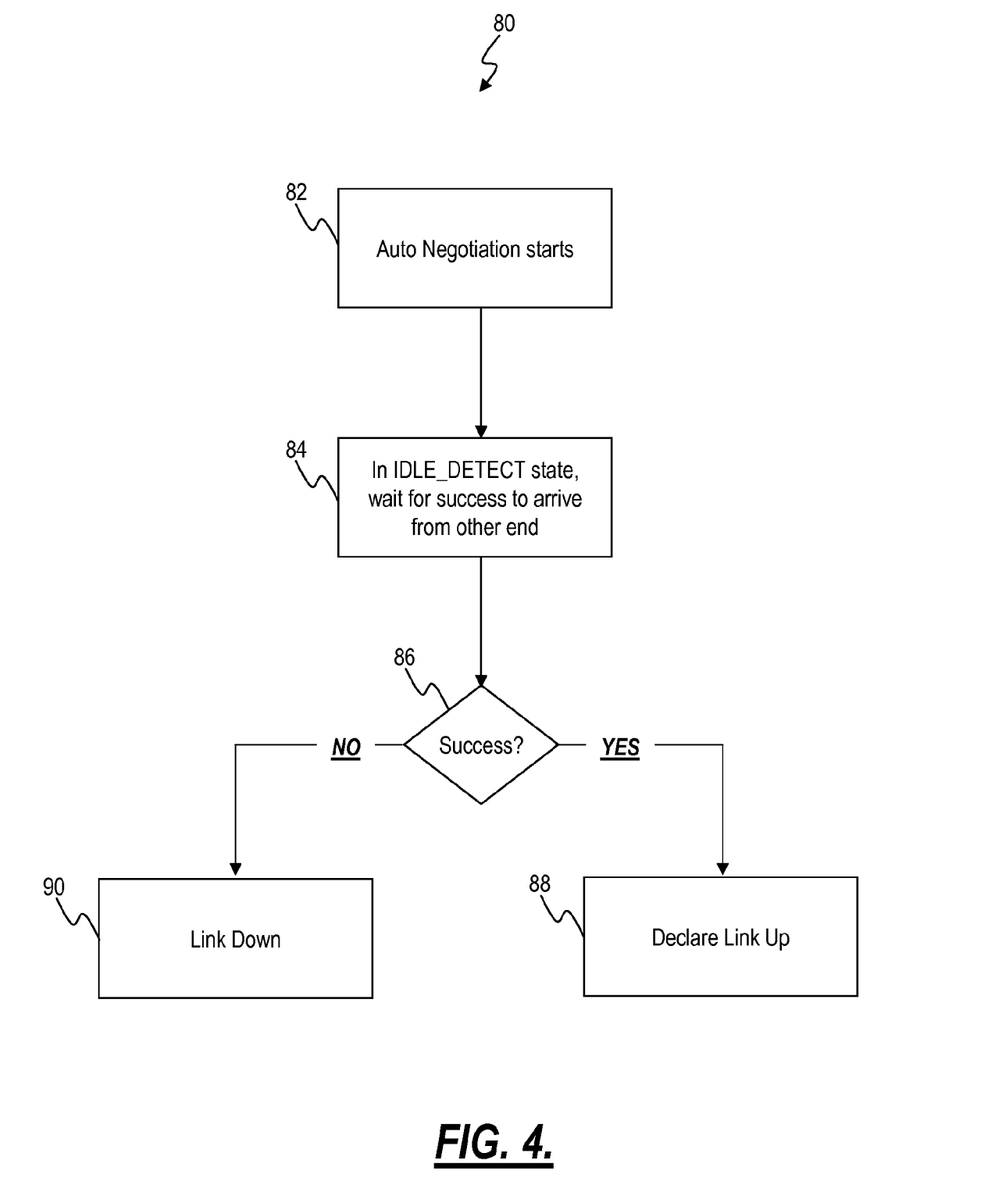
FIG. 4 is a flowchart illustrating an IDLE_DETECT wait implementation for distance-proof Auto Negotiation according to another exemplary embodiment of the present invention.

Referring to FIG. 4, a flowchart illustrates an IDLE_DETECT wait implementation 80 for distance-proof Auto Negotiation according to another exemplary embodiment of the present invention. Here, Auto Negotiation starts, such as the Auto Negotiation state diagram 30 in FIG. 2 (step 82). In the IDLE_DETECT state, the implementation 80 waits for success (or failure) from the other end (step 84). If the other end indicates success (step 86), then the implementation 80 declares the link up, e.g. moves to the LINK_OK state (step 88). If the other end indicates failure (step 86), then the implementation 80 declares the link down, e.g. sends breaklink to the other end and an attached client (step 90). Alternatively, the implementation 80 could include a pre-determined timer set to wait to avoid indefinitely waiting in the IDLE_DETECT state. Note, this implementation 80 is outside of the IEEE 802.3-2005 standard.

Figure 5:
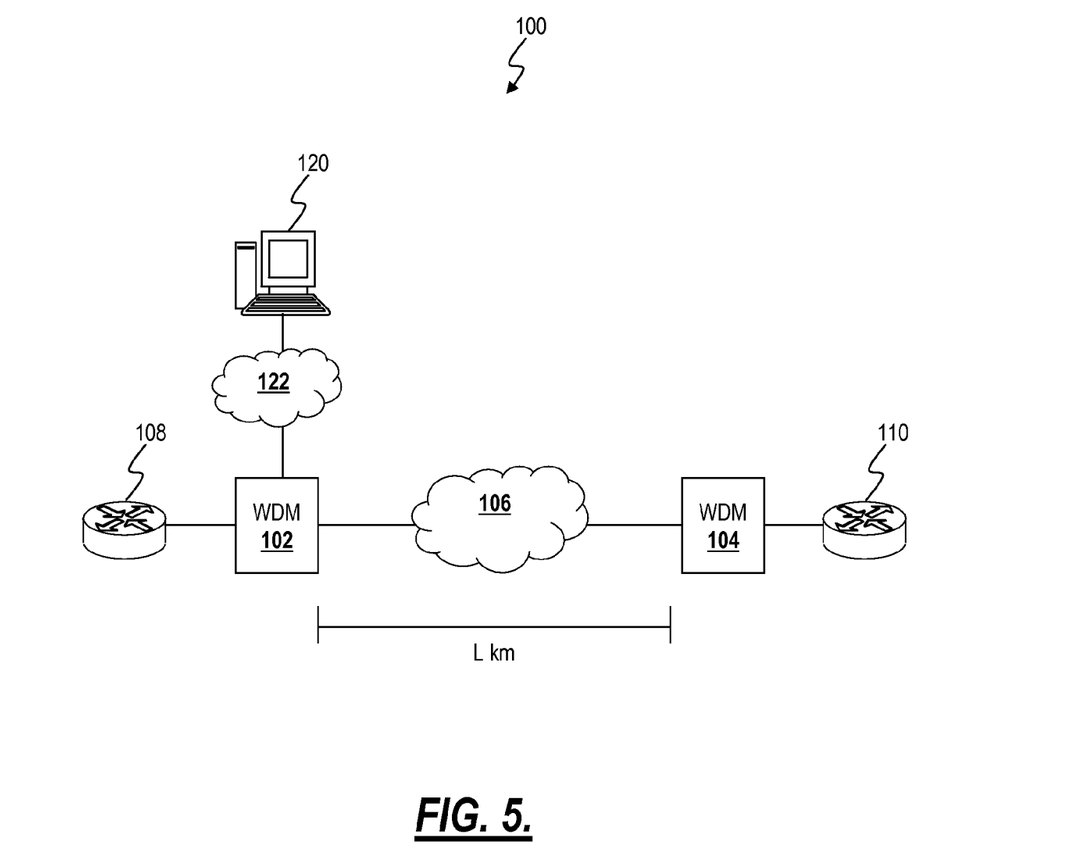
FIG. 5 is a network configured with distance proof n-pass Auto negotiation according to an exemplary embodiment of the present invention.

Referring to FIG. 5, a network 100 configured with distance proof n-pass Auto negotiation is illustrated according to an exemplary embodiment of the present invention. The network 100 includes a first WDM network element (NE) 102 connected to a second WDM NE 104 through an optical network 106. The WDM NEs 102,104 each include layer two-capable line modules connected to clients 108,110. In this embodiment, the WDM NEs 102,104 are configured to operate the n-pass implementation as described in FIG. 3. Note, the clients 108,110 do not need to implement these mechanisms since the latency between the clients 108,110 and associated NEs 102,104 is likely significantly less than 20 ms, requiring only a single pass using standard Auto Negotiation mechanisms.

Those of ordinary skill in the art will recognize that the WDM NEs 102,104 could also be SONET/SDH devices, Optical Cross Connects (OXC), Ethernet switches/routers, or the like. These devices can all be configured for extended reach over the optical network 102. The distance-proof mechanisms for Auto Negotiation can be included on any layer two capable line card in any of these systems, allowing for extended reaches while providing standards compliant 1000BASE-X Auto Negotiation.

The optical network 106 includes optical amplifiers, wavelength division multiplexers, optical add-drop multiplexers, and the like. Effectively, the optical network 106 is configured to provide a wavelength carrying the layer two traffic from the client 108 to the client 110 over an extended distance L km. In an exemplary embodiment, the number n passes through the n-pass implementation can be defined according to the formula:

$$n = C + \frac{\text{Average\_Round\_Trip\_between\_Clients}}{\text{Time\_for\_Single\_Auto\_Negotiation\_State\_Machine}}$$

where C is a constant value of 2 determined as one for the state machine at the WDM NE 102 to run and one for the state machine at the WDM NE 104 to run. The average round trip between the clients 108,110 is the latency of the optical network 106. For example, if the distance between WDM NEs 102,104 is 8000 km, the speed of light is approximately 300,000 km/s, hence the fastest a message can travel between the NEs 102,104 is 8000/300,000=27 ms (or a total round trip transit of 54 ms). The maximum time (if all link timers are allowed to expire) which the auto negotiation state machine can take to complete one pass is approximately 30 ms. This is calculated based on one timer at AN_RESTART, one timer at COMPLETE_ACKNOWLEDGE, one timer at IDLE_DETECT and assuming that the value of link timer is 10 ms+0 tolerance). So over 8000 km the number of passes required is n=2+54/30=2+1=3 passes.

The number of passes can be manually or automatically provisioned in the WDM NEs 102, 104. For example, a network management system (NMS) 120 can be connected to the WDM NE 102 through a data network 122. A user could manually set the number of passes through the NMS directly to the NE 102. For example, the NMS 102 could include a user interface setting the link distance, and automatically calculate n based on the formula provided herein. Also, the user could access the NE 104 through a data communication link over an optical service channel or the like to provision n on the NE 104. The NMS 120 can also include an element management system (EMS), craft interface (CI), or the like as is known in the art.

The NEs 102,104 can be configured to implement a latency measurement protocol to automatically determine the delay associated with the optical network 106. For example, NE 102 can send a message to NE 104, such as over the optical service channel. Before sending the message, NE 102 can include a hardware timestamp in the message. This is a request packet. On receiving the request packet, NE 104 can generate a response packet. NE 104 copies the timestamp value back (from the received request packet) to the response message and sends it to the NE 102. The NE 104 on receiving the response packet retrieves the timestamp value from the response packet. NE 104 then takes a fresh hardware timestamp. It then sees the difference between these timestamp and calculates the round trip time.

Accordingly, this value can be used in conjunction with the formula to automatically set n. This procedure can also be utilized in the other direction from NE 104 to NE 102. Note, there could be different n settings at the NEs 102,104. For example, there could be diverse paths of differing lengths L through the optical network 106. Alternatively, the NEs 102, 104 can include other mechanisms for determining latency as are known in the art.

Figure 6:
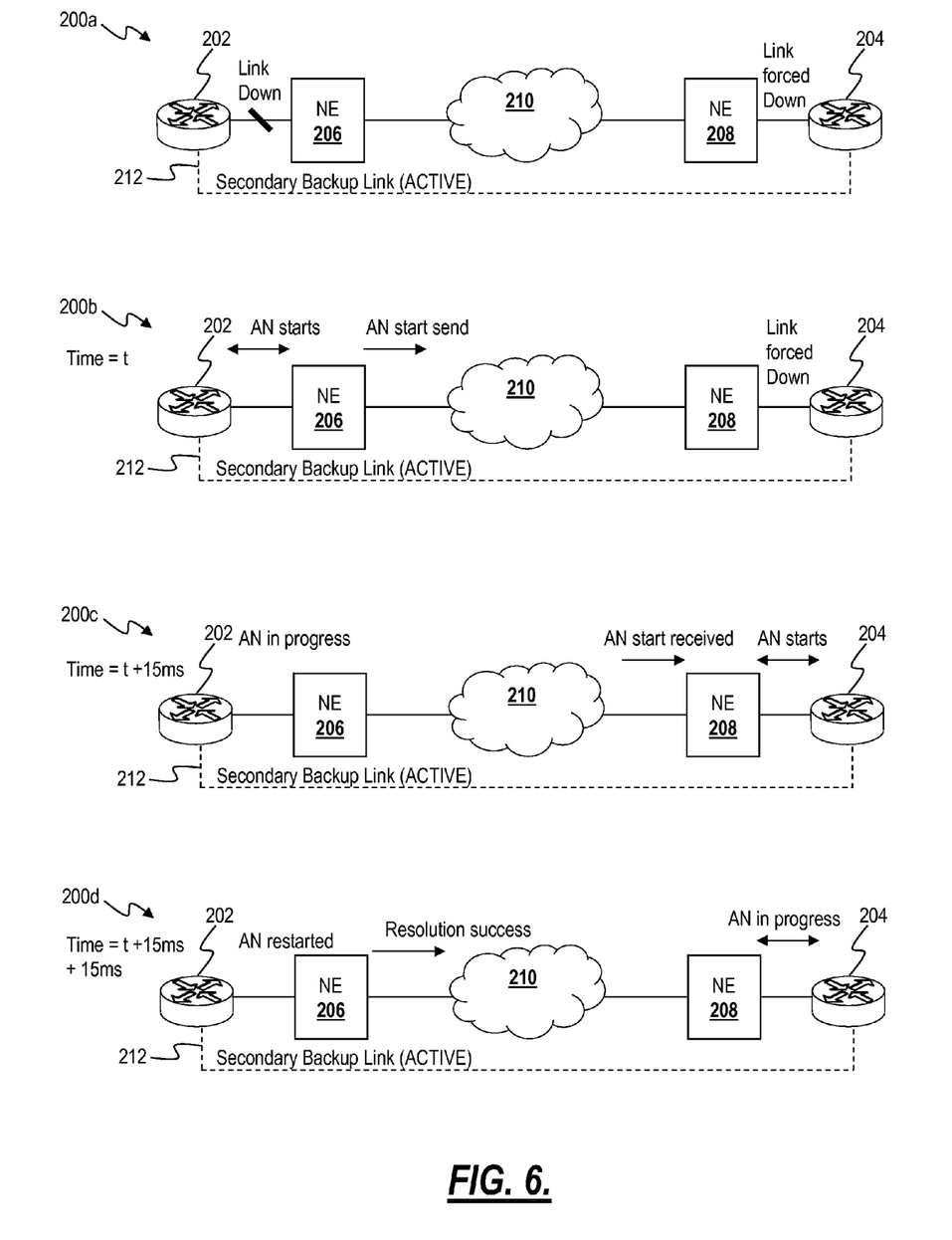
FIGS. 6 and 7 are an illustration of an exemplary implementation of a distance proof Auto Negotiation according to an exemplary embodiment of the present invention.
Figure 7:
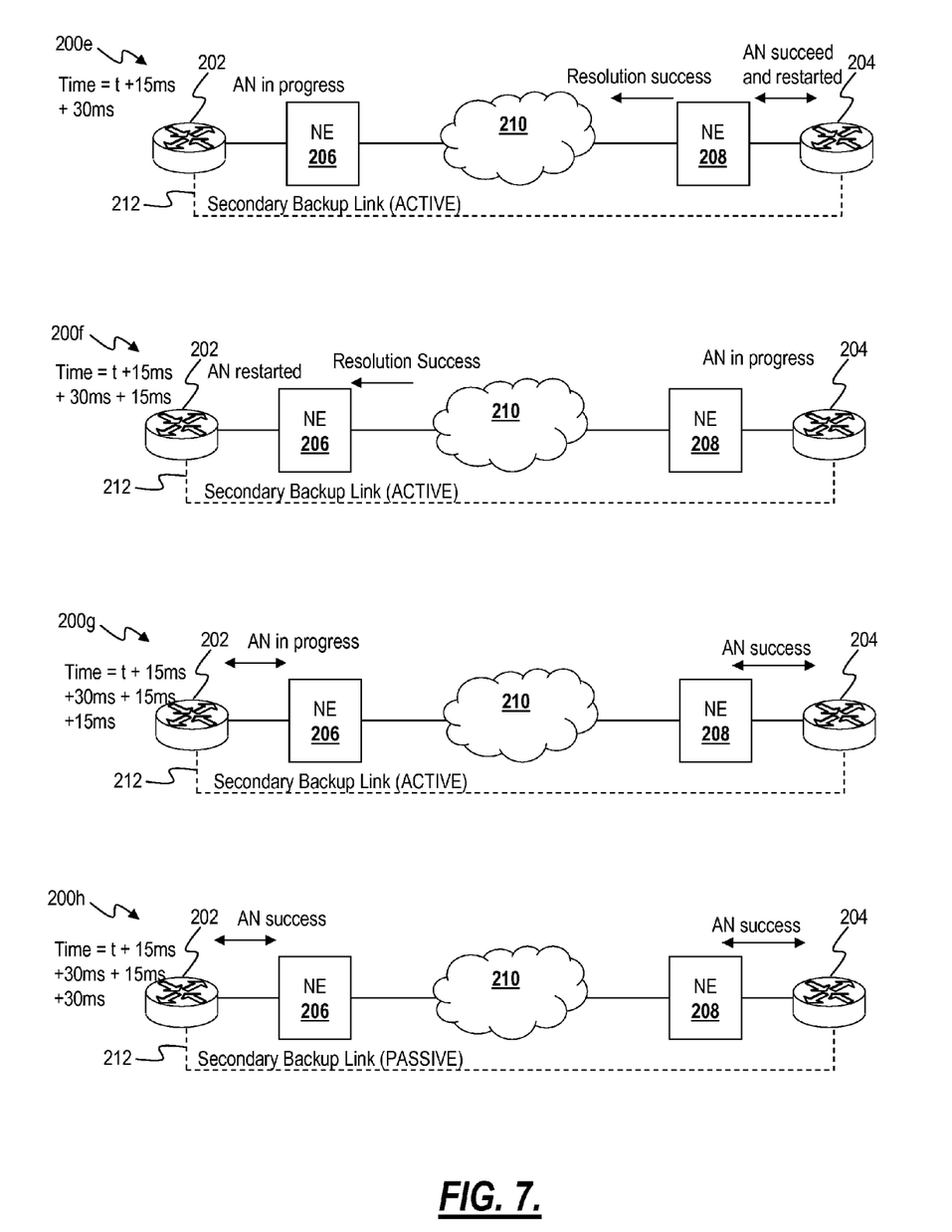

Referring to FIGS. 6 and 7, an exemplary implementation of a distance proof Auto Negotiation 200a-h is illustrated between clients 202,204 according to an exemplary embodiment of the present invention. In FIGS. 6 and 7, The client 202 is connected to an NE 206 which is connected to an NE 208 through an optical network 210. The client 204 is connected to the NE 208. The clients 202,204 can include Ethernet switches/routers or the like. The NEs 204,206 can include WDM NEs, SONET/SDH NEs, OTN NEs, and the like. In this example, the NEs 206,208 are each configured to operate the n-pass Auto Negotiation of the present invention, and the latency between the NEs 206,208 is 15 ms or a round trip time of 30 ms.

In FIG. 6, at step 200a, a link between the client 202 and the NE 206 is down forcing the links between the NEs 206,208 and between the NE 208 and client 204 down. Accordingly, a backup link 212 becomes active between the clients 202,204. The backup link 212 can be on a diverse path through the optical network 210 or on the same path with different modules in the event of a module failure. At step 200b (time t), the link is back up, and Auto Negotiation starts between the client 202 and the NE 206, and the NE 206 sends an Auto Negotiation start request to the NE 208 over the optical network.

At step 200c (time t+15 ms), the Auto Negotiation start request is received by the NE 208, and Auto Negotiation is still in progress between the client 202 and the NE 206. Upon receipt of the Auto Negotiation start request, Auto Negotiation begins between the NE 208 and the client 204. At step 200d (time t+15 ms+15 ms), Auto Negotiation between the NEs 206,208 resolves successfully, Auto Negotiation is still in progress between the NE 208 and the client 204, and Auto Negotiation has restarted based on the mechanisms of the present invention between the NE 206 and the client 202.

In FIG. 7, at step 200e (time t+15 ms+30 ms), Auto Negotiation is successful between the NE 208 and the client 204, i.e. 30 ms is the time for the state machine to run following receiving the restart request in step 200c. Accordingly, resolution is successful and the NE 208 restarts Auto Negotiation for the first pass. The NE 208 sends a success indication to the NE 206, and Auto Negotiation is in progress for the second pass between the NE 206 and the client 202. At step 200f (time t+15 ms+30 ms+15 ms), the success indication message is received at the NE 206. Also, the second pass is now complete between the NE 206 and the client 202 so there is a possibility that the remote link status may be received at or after this complete, i.e. with timer expiry in IDLE_DETECT between the NE 206 and the client 202, and this link is declared down. Accordingly, the NE 206 and the client 202 utilize an extra pass to give ample time for the remote link status packet to be received.

At step 200g (time t+15 ms+30 ms+15 ms+15 ms), Auto Negotiation for the third pass is in progress between the NE 206 and the client 202, and the success message has been received from the NE 208. Auto Negotiation is successful between the NE 208 and the client 204. At step 200h (time t+15 ms+30 ms+15 ms+30 ms), Auto Negotiation for the third pass completes between the NE 206 and the client 202, and the success message has been received from the NE 208. Accordingly, the Auto Negotiation state machine exits IDLE_DETECT to LINK_OK, and the link is brought up between the NE 206 and the client 202, between the NEs 206,208, and between the NE 208 and the client 204, and the backup link 212 is taken down. Hence, Auto Negotiation is successful despite a 30 ms delay round trip between the NEs 206,208.

Additionally, other mechanisms could be used to extend Auto Negotiation time. For example, the LINK_TIMER could be manually extended for the NEs over an extended distance. However, this implementation and the implantation described in FIG. 4 would not be standards compliant, but they would provide a distance proof Auto Negotiation solution.

The various exemplary embodiments described herein can be utilized to make Auto Negotiation mechanisms distance proof. In one particular example, this could be used in Storage Area Network (SAN) applications. Internet Protocol (IP)-based SAN is emerging as one of the fastest growing SAN technologies. These utilize Ethernet at layer two. Accordingly, the present invention could be utilized to provide distance extension to IP SAN's with virtually no distance limitation with regard to Auto Negotiation.

The mechanisms described herein reference GbE as an exemplary implementation. Those of ordinary skill in the art will recognize that the present invention can equally apply to other types of extended-reach Ethernet implementations, such as 10 GbE, 100 GbE, and the like. Also, these mechanisms can be enabled or disable in a device.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for distance proof Auto Negotiation, comprising:
   determining a delay between a first and second node, wherein the first and second nodes comprise an Ethernet link configured to Auto Negotiate; and
   implementing delay mechanisms at the first and second nodes in Auto Negotiation responsive to the determined delay, wherein the delay mechanisms comprise:
      setting a variable n comprising the number of Auto Negotiation restarts responsive to the determined delay, wherein n is a function of the measured latency between the first and second nodes;
      restarting Auto Negotiation up to n times responsive to successful priority resolution; and
      if Auto Negotiation is restarted n times without receiving an indication, declaring link down at the end of the nth time Auto Negotiation is run;
   wherein the delay mechanisms are implemented in layer two devices on each of the first and second nodes with each of the layer two devices connected to client devices operating Auto Negotiation, and wherein the client devices are configured through the layer two devices and the delay mechanisms to Auto Negotiate regardless of distance between the first and second node.

2. The method for distance proof Auto Negotiation of claim 1, wherein n is one of manually set through a management system connected to the first and second nodes and automatically set by the first and second nodes.

3. The method for distance proof Auto Negotiation of claim 1, wherein the determined delay is measured through a latency measurement algorithm between the first and second nodes; and
   wherein the latency measurement algorithm comprises an exchange of timestamped messaged between the first and second nodes to determine delay.

4. The method for distance proof Auto Negotiation of claim 1, wherein n is determined based on a constant value of two representing one restart for each state machine at the first and second node plus an average round trip delay between the first and second nodes divided by a time for running Auto Negotiation.

5. The method for distance proof Auto Negotiation of claim 1, wherein the delay mechanisms comprise waiting at IDLE_DETECT during Auto Negotiation at the first node until reception of an indication from the second node.

6. The method for distance proof Auto Negotiation of claim 5, wherein the waiting at IDLE_DETECT is up to a predetermined time period.

7. The method for distance proof Auto Negotiation of claim 1, wherein the first and second nodes comprise optical network elements; and
wherein the delay is responsive to latency associated with an extended distance between the first and second nodes.

8. A method for distance proof n-pass Auto Negotiation, comprising:
determining a delay between a first and second node, wherein the first and second nodes comprise a Gigabit Ethernet link configured to Auto Negotiate;
setting a variable n comprising the number of Auto Negotiation restarts responsive to the determined delay, wherein n is a function of the measured latency between the first and second nodes;
receiving an Auto Negotiation start at the first node;
starting an Auto Negotiation state machine at the first node;
during an IDLE_DETECT state, restarting Auto Negotiation at both the first and second node up to n times responsive to successful priority resolution; and
if Auto Negotiation is restarted n times without receiving an indication from the second node, declaring link down at the end of the nth time Auto Negotiation is run;
wherein delay mechanisms are implemented in layer two devices on each of the first and second nodes with each of the layer two devices connected to client devices operating Auto Negotiation, and wherein the client devices are configured through the layer two devices and the delay mechanisms to Auto Negotiate regardless of distance between the first and second node.

9. The method for distance proof n-pass Auto Negotiation of claim 8, wherein n is one of manually set through a management system connected to the first and second nodes and automatically set by the first and second nodes.

10. The method for distance proof n-pass Auto Negotiation of claim 8, wherein the determined delay is measured through a latency measurement algorithm between the first and second nodes; and
wherein the latency measurement algorithm comprises an exchange of timestamped messaged between the first and second nodes to determine delay.

11. The method for distance proof n-pass Auto Negotiation of claim 8, wherein n is determined based on a constant value of two representing one restart for each state machine at the first and second node plus an average round trip delay between the first and second nodes divided by a time for running Auto Negotiation.

12. The method for distance proof n-pass Auto Negotiation of claim 8, wherein the first and second nodes comprise optical network elements; and
wherein the delay is responsive to latency associated with an extended distance between the first and second nodes.

13. The method for distance proof n-pass Auto Negotiation of claim 8, wherein the method for distance proof n-pass Auto Negotiation is compliant to IEEE 802.3 standards for 1000BASE-X Auto Negotiation published in 2005.

14. A network configured for distance proof Auto Negotiation, comprising:
a first optical network element connected to a first Ethernet client device; and
a second optical network element connected to a second Ethernet client device, wherein the second optical network element is interconnected to the first optical network element through an optical network, and wherein the optical network causes delay between the first optical network element and the second optical network element;
wherein each of the first optical network element, the second optical network element, the first Ethernet client device, and the second Ethernet client device is configured to perform Auto Negotiation;
wherein the first optical network element and the second optical network element are configured to provide distance proof Auto Negotiation comprising implementing delay mechanisms in Auto Negotiation responsive to the delay between the first optical network element and the second optical network element, wherein the delay mechanisms comprise:
determining the delay between the first optical network element and the second optical network element;
setting a variable n comprising the number of Auto Negotiation restarts responsive to the determined delay, wherein n is a function of the measured latency between the first and second optical network elements;
restarting Auto Negotiation up to n times responsive to successful priority resolution; and
if Auto Negotiation is restarted n times without receiving an indication, declaring link down at the end of the nth time Auto Negotiation is run at the first optical network element; and
wherein the delay mechanisms are implemented in layer two devices on each of the first optical network element and the second optical network element with each of the layer two devices connected to the first Ethernet client device and the second Ethernet client device operating Auto Negotiation, and wherein the first Ethernet client device and the second Ethernet client device are configured through the layer two devices and the delay mechanisms to Auto Negotiate regardless of distance between the first optical network element and the second optical network element.

15. The network configured for distance proof Auto Negotiation of claim 14, wherein n is one of manually set through a management system connected to the first and second optical network elements and automatically set by the first and second optical network elements.

16. The network configured for distance proof Auto Negotiation of claim 14, wherein the determined delay is measured through a latency measurement algorithm between the first and second optical network elements; and
wherein the latency measurement algorithm comprises an exchange of timestamped messages between the first and second optical network elements to determine delay.

17. The network configured for distance proof Auto Negotiation of claim 14, wherein n is determined based on a constant value of two representing one restart for each state machine at the first and second node plus an average round trip delay between the first and second nodes divided by a time for running Auto Negotiation.

18. The network configured for distance proof Auto Negotiation of claim 14, wherein the first and second Ethernet client devices comprise storage area network devices.

19. The method for distance proof Auto Negotiation of claim 7, wherein the first and second nodes comprise optical network elements separated by a distance with a route transit time such that the route transit time results in one state machine finishing before another signals a success or failure indication in Auto Negotiation, and wherein the method provides Auto Negotiation compliant to IEEE 802.3-2005 despite the distance and the route transit time.

* * * * *